US011352487B2

(12) United States Patent
Michels

(10) Patent No.: US 11,352,487 B2
(45) Date of Patent: Jun. 7, 2022

(54) ABS MOLDING COMPOUND HAVING A GOOD PROPERTY COMBINATION OF PROCESSABILITY AND SURFACE QUALITY

(71) Applicant: INEOS STYROLUTION GROUP GMBH, Frankfurt am Main (DE)

(72) Inventor: Gisbert Michels, Leverkusen (DE)

(73) Assignee: INEOS STYROLUTION GROUP GMBH, Frankfurt am Main (DE)

( * ) Notice: Subject to any disclaimer, the term of this patent is extended or adjusted under 35 U.S.C. 154(b) by 65 days.

(21) Appl. No.: 15/573,658

(22) PCT Filed: May 12, 2016

(86) PCT No.: PCT/EP2016/060620
§ 371 (c)(1),
(2) Date: Nov. 13, 2017

(87) PCT Pub. No.: WO2016/184765
PCT Pub. Date: Nov. 24, 2016

(65) Prior Publication Data
US 2018/0118932 A1 May 3, 2018

(30) Foreign Application Priority Data
May 18, 2015 (EP) .................................. 15167936

(51) Int. Cl.
| | | |
|---|---|---|
| *C08L 25/12* | (2006.01) | |
| *C08F 279/04* | (2006.01) | |
| *C08J 3/00* | (2006.01) | |
| *C08J 3/14* | (2006.01) | |

(52) U.S. Cl.
CPC ............ *C08L 25/12* (2013.01); *C08F 279/04* (2013.01); *C08J 3/005* (2013.01); *C08J 3/14* (2013.01); *C08J 2325/12* (2013.01); *C08J 2409/10* (2013.01); *C08J 2425/12* (2013.01); *C08L 2205/025* (2013.01); *C08L 2205/03* (2013.01)

(58) Field of Classification Search
CPC ...... C08L 2205/03; C08L 55/02; C08L 25/12; C08J 3/14; C08J 2425/12; C08J 2325/12; C08J 2409/10
See application file for complete search history.

(56) References Cited

U.S. PATENT DOCUMENTS

| | | |
|---|---|---|
| 3,553,167 A | 1/1971 | Schnell et al. |
| 4,075,173 A | 2/1978 | Maruyama et al. |
| 4,156,069 A | 5/1979 | Prevorsek et al. |
| 4,311,823 A | 1/1982 | Imai et al. |
| 4,713,420 A | 12/1987 | Henton |
| 4,772,743 A | 9/1988 | Schmidt et al. |
| 4,982,014 A | 1/1991 | Freitag et al. |
| 5,071,946 A | 12/1991 | Schmidt et al. |
| 5,100,945 A | 3/1992 | Schmidt et al. |
| 5,126,428 A | 6/1992 | Freitag et al. |
| 5,227,458 A | 7/1993 | Freitag et al. |
| 2002/0103295 A1 | 8/2002 | Eichenauer |
| 2002/0103296 A1 | 8/2002 | Eichenauer |
| 2003/0092836 A1* | 5/2003 | Eichenauer ............ C08F 279/02 525/71 |
| 2003/0225219 A1 | 12/2003 | Eichenauer et al. |
| 2004/0132905 A1* | 7/2004 | Eichenauer ............ C08F 279/02 525/63 |
| 2006/0122325 A1 | 6/2006 | Wenz et al. |
| 2009/0281216 A1 | 11/2009 | Avtomonov et al. |

FOREIGN PATENT DOCUMENTS

| | | |
|---|---|---|
| DE | 1495626 B1 | 6/1971 |
| DE | 2232877 A1 | 1/1974 |
| DE | 2703376 A1 | 8/1977 |
| DE | 2714544 A1 | 10/1977 |
| DE | 3000610 A1 | 7/1980 |
| DE | 3639904 A1 | 6/1988 |
| DE | 3832396 A1 | 2/1990 |
| DE | 3913509 A1 | 10/1990 |
| DE | 10008420 A1 | 8/2001 |
| EP | 0094135 A1 | 11/1983 |
| EP | 0190884 A2 | 8/1986 |
| EP | 328960 A2 * | 8/1989 |
| EP | 0328960 A2 | 8/1989 |
| EP | 1567596 B1 | 8/2005 |
| WO | 01/62848 A1 | 8/2001 |
| WO | 2012/022710 A1 | 2/2012 |

OTHER PUBLICATIONS

Pages 64 and 65 of textbook "Design of Experiments—Principles and Applications", eds. Eriksson et al., 3rd edition, Umetrics Academy, Sweden, 2008.

(Continued)

*Primary Examiner* — Mark S Kaucher
(74) *Attorney, Agent, or Firm* — J.A. Lindeman & Co. PLLC

(57) ABSTRACT

The present invention relates to thermoplastic molding compounds F containing at least two graft rubbers P-I and P-II which are processed by the co-precipitation of a mixture of the respective emulsions containing P-I and P-II. The present invention further relates to a method for producing such thermoplastic molding compounds F and to molded bodies obtained from a thermoplastic molding compound F according to the invention.

19 Claims, No Drawings

(56) References Cited

OTHER PUBLICATIONS

Wörterbuch Chemie Deutsch-Englisch (Dictionary of chemistry: German/English), ed. Gerhard Wenske, VCH Verlagsgesellschaft mbH, Weinheim, Germany, 1994, pp. 1028 and 1659.
Wörterbuch Chemie Englisch-Deutsch (Dictionary of chemistry: English/German), ed. Gerhard Wenske, VCH Verlagsgesellschaft mbH, Weinheim, Germany, 1992, pp. 1006 and 1290.
Austin and Hux, "A brief note on overlapping confidence intervals", Journal of Vascular Surgery, Statistical Comment, 2002, 36(1):194-195.

* cited by examiner

ABS MOLDING COMPOUND HAVING A GOOD PROPERTY COMBINATION OF PROCESSABILITY AND SURFACE QUALITY

The present invention relates to thermoplastic molding compositions F which comprise at least two graft rubbers P-I and P-II, the process of production of which is completed via coprecipitation of a mixture of the respective emulsions comprising P-I and P-II. The present invention further comprises a process for the production of these thermoplastic molding compositions F, and also moldings which are obtainable or obtained from a thermoplastic molding composition F of the invention.

Acrylonitrile-butadiene-styrene copolymers (ABS) and ABS-type molding compositions which can also comprise further comonomers (as structural units) and/or other thermoplastic components have been in general use for some years as thermoplastic molding compositions for production of moldings for various applications. The property profile of these thermoplastic molding compositions can be varied widely. Of particular interest for many applications is the fact that these molding compositions have particularly high toughness (for example impact resistance and/or notched impact resistance). They also have the following desired properties: good processability (thermoplastic flowability, MVR), heat resistance, surface gloss and surface homogeneity and it is thus possible to achieve a quality with a comparatively low "pimple count".

These properties can be varied and adapted to meet requirements. It is desirable to provide molding compositions with the respective particularly advantageous property combinations for different application sectors. There is moreover a need for fundamental improvement of the production processes, in particular for ABS products. In processed used hitherto, improvement of one property has often been obtained by accepting impairment of one or more other properties.

By way of example, WO 2001/62848 describes ABS molding compositions which comprise at least three graft rubbers. These molding compositions have comparatively good toughness and processability. However, the surface homogeneity of those molding compositions, or of the moldings, has been found to be unsatisfactory.

EP-A 1 567 596 teaches uniform-size coprecipitated graft rubbers which give a desired surface quality. However, it is necessary here to use redox initiation for the production of a graft rubber. The toughness values and processability of the molding compositions moreover require improvement.

There is therefore a need to provide a thermoplastic molding composition which is easy to produce and which has favorable properties not only in relation to toughness and processability but also in relation to surface quality.

Surprisingly, it has been found that a thermoplastic molding composition which comprises coprecipitated different graft rubbers has these favorable properties and moreover is comparatively easy to produce. It is surprising here that the inventive thermoplastic molding composition F described, which comprises coprecipitated graft rubbers P-I and P-II (which are preferably obtained exclusively by persulfate initiation), exhibits good impact resistance and notched impact resistance and moreover better surface homogeneity or in other respects exhibiting properties comparable with those of a comparable molding composition from WO 2001/62848.

A first aspect of the present invention relates to a thermoplastic molding composition F comprising (or consisting of):

I) at least one graft rubber P-I obtained by emulsion polymerization with inorganic persalt initiation (initiation with use of a salt of a peroxo acid) and polymerization of styrene and acrylonitrile in a styrene:acrylonitrile ratio by weight of from 95:5 to 50:50, where styrene can be replaced entirely or to some extent by alpha-methylstyrene, and where acrylonitrile can be replaced entirely or to some extent by methyl methacrylate or N-phenylmaleimide, in the presence of:
at least one polybutadiene latex A with average particle diameter $d_{50}$ from 230 to 330 nm and at least one polybutadiene latex B with average particle diameter $d_{50}$ from 340 to 480 nm,
where the polybutadiene latices A and B have been obtained by means of seed polymerization starting from a polybutadiene latex C with average particle diameter $d_{50}$ from 10 to 220 nm (as seed latex);
II) at least one graft rubber P-II obtained by emulsion polymerization with inorganic persalt initiation and polymerization of styrene and acrylonitrile in a styrene:acrylonitrile ratio by weight of from 95:5 to 50:50, where styrene can be replaced entirely or to some extent by alpha-methylstyrene, and where acrylonitrile can be replaced entirely or to some extent by methyl methacrylate or N-phenylmaleimide, in the presence of the polybutadiene latex C with average particle diameter $d_{50}$ from 10 to 220 nm;
III) at least one rubber-free copolymer matrix P-III made of styrene and acrylonitrile in a styrene:acrylonitrile ratio by weight of from 95:5 to 50:50, where styrene can be replaced entirely or to some extent by alpha-methylstyrene,
IV) optionally one or more thermoplastic components T not composed of vinyl monomers; and
V) optionally one or more additives D, where the graft rubbers P-I and P-II are (or have been) worked up by coprecipitation of a mixture of the respective emulsions (or latices) comprising P-I and P-II.

It is particularly preferable that the thermoplastic molding composition F consists of the abovementioned components I) to III) and optionally IV) and V).

The thermoplastic molding composition F of the invention is in particular characterized in that the graft rubbers P-I and P-II are produced by inorganic persalt initiation, and in that the process of production thereof is completed via coprecipitation after mixing of the emulsions comprising the graft rubbers P-I and P-II.

A preferred embodiment of a thermoplastic molding composition F for the purposes of the present invention can also be found in the experimental examples section below. This also applies to the subcomponents of the thermoplastic molding composition F revealed herein.

It is preferable that the thermoplastic molding composition F is produced by a process as described herein. The thermoplastic molding composition F can also be termed polymer composition.

The expressions "graft rubber" and "graft rubber polymer" here are to be understood in the widest sense as synonyms meaning graft polymer with a core made of polybutadiene latex and a graft shell consisting of at least 50% by weight of thermoplastic material.

The expressions "butadiene latex", "polybutadiene latex" and "butadiene polymer latex" are likewise to be understood in the broadest sense as synonyms meaning particulate materials consisting mainly of, i.e. of at least 50% by weight, of butadiene units.

The general rule throughout this application is that weight data and data and definitions relating to ratios by weight, data in percent by weight (% by weight) and data in parts by weight are based on the respective weights of the dry substance (calculated as solid), i.e. without liquids that are comprised or that have been absorbed (e.g. water, electrolyte solution and unincorporated monomers). "Ratio by weight" and "ratio by mass" are to be understood as synonyms.

The data in percent by weight (% by weight) used herein are to be understood as implying that the entire composition is always 100% by weight. When a composition comprises a certain proportion of one or more components, the proportion of one or more other components not mentioned is consequently 100% by weight minus the proportion of the one or more components mentioned. When a composition consists of certain components, the total proportion of these components is always 100% by weight. The person skilled in the art will easily determine the options available for the remaining components in the light of the stated proportion of other components.

The average particle diameter $d_{50}$ used herein can be determined by ultracentrifuge measurement (cf. W. Scholtan, H. Lange: Kolloid Z. u. Z. Polymere 250, pp. 782-796 (1972)).

In a preferred embodiment of the thermoplastic molding composition F, the graft rubber P-I is obtained by emulsion polymerization of styrene and acrylonitrile in a ratio by weight of from 80:20 to 65:35 onto the polybutadiene latices A and B. It is preferable that the styrene:acrylonitrile ratio by weight is from 70:30 to 75:25.

An embodiment of a graft rubber P-I can also be found in the experimental examples section below. The person skilled in the art will understand that "styrene", "acrylonitrile", "butadiene" etc. mean the units embedded into the respective (co)polymer structure.

In a preferred embodiment of the thermoplastic molding composition F, the graft rubber P-II is obtained by emulsion polymerization of styrene and acrylonitrile in a ratio by weight of from 80:20 to 65:35 onto the polybutadiene latex C. It is particularly preferable that the styrene:acrylonitrile ratio by weight is from 70:30 to 75:25.

A preferred embodiment of a graft rubber P-II can also be found in the experimental examples section below.

In a preferred embodiment of the thermoplastic molding composition F, the rubber-free copolymer matrix P-III is a styrene-acrylonitrile copolymer with a ratio by weight of from 80:20 to 65:35. It is particularly preferable for the thermoplastic molding composition F that the rubber-free copolymer matrix P-III is a styrene-acrylonitrile-copolymer with a styrene:acrylonitrile ratio by weight of from 70:30 to 75:25.

It is preferable for the thermoplastic molding composition F that the graft rubber P-I is obtained by emulsion polymerization of styrene and acrylonitrile in a styrene:acrylonitrile ratio by weight of from 80:20 to 65:35 onto the polybutadiene latices A and B, and that the graft rubber P-II is obtained by emulsion polymerization of styrene and acrylonitrile in a styrene:acrylonitrile ratio by weight of from 80:20 to 65:35 onto the polybutadiene latex C.

It is particularly preferable for the thermoplastic molding composition F that the graft rubber P-I is obtained by emulsion polymerization of styrene and acrylonitrile in a ratio by weight of from 80:20 to 65:35 onto the polybutadiene latices A and B; that the graft rubber P-II is obtained by emulsion polymerization of styrene and acrylonitrile in a ratio by weight of from 80:20 to 65:35 onto the polybutadiene latex C; and that the rubber-free copolymer matrix P-III is a styrene-acrylonitrile copolymer with a ratio by weight of from 80:20 to 65:35. A preferred embodiment of a rubber-free copolymer P-III can also be found in the experimental examples section below.

As set out above, materials that can be used as rubber-free copolymer matrix P-III are mainly copolymers of styrene and acrylonitrile with a styrene:acrylonitrile ratio by weight of from 95:5 to 50:50, where styrene and/or acrylonitrile can be replaced entirely or to some extent (by alpha-methylstyrene, methyl methacrylate, N-phenylmaleimide or a mixture thereof). Preference is given to rubber-free copolymers P-III with <30% by weight content of copolymerized acrylonitrile units. It is preferable that the rubber-free copolymers P-III have average molecular weights $M_w$ of from 20 000 to 200 000 and/or limiting viscosity values [η] of from 20 to 110 ml/g (measured in dimethylformamide at 25° C.). Details of the production of these rubber-free copolymers P-III are described by way of example in DE-A 24 20 358 and DE-A 27 24 360. These rubber-free copolymers P-III are also described by way of example in DE-A 1 971 3509, where the copolymers P-III can be produced either by purely thermal initiation or else by addition of initiators, in particular peroxide. Particular preference is given to vinyl resins produced by bulk polymerization or solution polymerization. The copolymers can be added alone or in any desired mixture.

Materials that can also be used as rubber-free copolymer matrix in the molding composition, other than thermoplastic components composed of vinyl monomers, are polycondensates, for example aromatic polycarbonates, aromatic polyester carbonates, polyesters, and polyamides. These are then used as thermoplastic components T. Numerous suitable thermoplastic polycarbonates and polyester carbonates are known (cf. by way of example DE-A 14 95 626, DE-A 22 32 877, DE-A 27 03 376, DE-A 27 14 544, DE-A 30 00 610, DE-A 38 32 396, and also in particular DE-A 100 08 420 and WO 2012/022710.

As set out above, the polybutadiene latex A has an average particle diameter $d_{50}$ of from 230 to 330 nm and a widely defined gel content. In a preferred embodiment, the average particle diameter $d_{50}$ of the polybutadiene latex A is from 240 to 320 nm, in particular from 250 to 310 nm. In a preferred embodiment, the gel content of the polybutadiene latex A is from 30 to 80% by weight, preferably from 40 to 75% by weight, in particular from 45 to 70% by weight.

In a preferred embodiment of the thermoplastic molding composition F, the polybutadiene latex A has an average particle diameter $d_{50}$ of from 240 to 320 nm, in particular from 250 to 310 nm, and gel content of from 30 to 80% by weight, preferably from 40 to 75% by weight, in particular from 45 to 70% by weight. It is particularly preferable that the polybutadiene latex A has an average particle diameter $d_{50}$ of from 250 to 310 nm and gel content of from 45 to 70% by weight.

A particularly preferred embodiment of a polybutadiene latex A can also be found in the experimental examples section below.

The stated values for the respective gel contents can be determined by the methods conventionally used for this purpose, by the wire-cage determination method in toluene (cf. Houben-Weyl, Methoden der Organischen Chemie, Makromolekulare Stoffe [Methods of Organic Chemistry, Macromolecular Substances], part 1, p. 307 (1961), Thieme Verlag Stuttgart). The gel contents of the polybutadiene latices A, B and C and optionally of other latices, can be adjusted in a manner that is in principle known by use of suitable reaction conditions (e.g. higher reaction temperature and/or polymerization to high conversion, and also optionally addition of crosslinking substances in order to achieve high gel content or, for example, low reaction temperature and/or termination of the polymerization reaction before onset of an excessive degree of crosslinking, and also optionally addition of molecular-weight regulators, for example n-dodecyl mercaptan or tert-dodecyl mercaptan, in order to achieve low gel content). Emulsifier used can be a conventional anionic emulsifier, for example alkyl sulfate, alkylsulfonate, aralkylsulfonate, a soap of a saturated or unsaturated fatty acid, or else of alkaline disproportionated or hydrogenated abietic or tall oil acid; it is preferable to use emulsifiers having carboxy groups (e.g. salts of $C_{10}$-$C_{18}$-fatty acids, disproportionated abietic acid, emulsifiers of DE-A 36 39 904 and DE-A 39 13 509).

As set out above, the polybutadiene latex B has an average particle diameter $d_{50}$ of from 340 to 480 nm and any desired gel content. In a preferred embodiment, the average particle diameter $d_{50}$ of the polybutadiene latex B is from 350 to 470 nm, in particular from 360 to 460 nm. In a preferred embodiment, the gel content of the polybutadiene latex B is from 50 to 95% by weight, in particular from 55 to 90% by weight.

In a more preferred embodiment, the polybutadiene latex B has an average particle diameter $d_{50}$ of from 350 to 470 nm, in particular from 360 to 460 nm, and gel content of from 50 to 95% by weight, in particular from 55 to 90% by weight. It is particularly preferable that the polybutadiene latex B has an average particle diameter $d_{50}$ of from 360 to 460 nm and gel content of from 55 to 90% by weight.

A preferred embodiment of a polybutadiene latex B can also be found in the experimental examples section below.

As set out above, the polybutadiene latex C has an average particle diameter $d_{50}$ of from 10 to 220 nm and any desired gel content. In a preferred embodiment, the average particle diameter $d_{50}$ of the polybutadiene latex C is from 20 to 210 nm, in particular from 30 to 200 nm. In a preferred embodiment, the gel content of the polybutadiene latex C is from 30 to 98% by weight, preferably from 40 to 95% by weight, in particular from 50 to 92% by weight. In a preferred embodiment, the polybutadiene latex C has an average particle diameter $d_{50}$ of from 20 to 210 nm, in particular from 30 to 200 nm, and gel content of from 30 to 98% by weight, preferably from 40 to 95% by weight, in particular from 50 to 92% by weight.

It is particularly preferable that the polybutadiene latex C has an average particle diameter $d_{50}$ of from 30 to 200 nm and gel content of from 50 to 92% by weight.

It is particularly preferable that the polybutadiene latex C has an average particle diameter $d_{50}$ of from 30 to 200 nm and gel content of from 50 to 92% by weight. When polybutadiene latex C with average particle diameters $d_{50}$ above 80 nm, preferably above 90 nm and particularly preferably above 100 nm, is used, this polybutadiene latex C is itself preferably also produced by seed polymerization. For this purpose it is preferable to use a polybutadiene latex with average particle diameters $d_{50}$ of from 10 to 60 nm, preferably from 20 to 50 nm. The average particle diameter $d_{50}$ of the seed latex that can be used for this purpose (preferably a polybutadiene latex) is preferably from 10 to 60 nm, with preference from 20 to 50 nm. The gel content of the small seed latex component is from 10 to 95% by weight, preferably from 20 to 90% by weight and particularly preferably from 30 to 85% by weight. A preferred embodiment of a polybutadiene latex C can also be found in the experimental examples section below.

The polybutadiene latices A, B and C can be produced by any desired process known in the prior art. It is preferable that the polybutadiene latices A, B and C are respectively (mutually independently) produced by emulsion polymerization of butadiene units (and optionally of other components) by what is known as the seed polymerization technique in which a fine-particle polymer, preferably a polybutadiene polymer, is first produced as seed latex and is then further polymerized by further reaction with monomers comprising butadiene monomers to give larger particles (see, for example, Houben-Weyl, Methoden der Organischen Chemie, Makromolekulare Stoffe [Methods of Organic Chemistry, Macromolecular Substances], part 1, p. 339 (1961), Thieme Verlag Stuttgart). It is preferable here to use the seed-batch method or the seed-feed method.

Seed latex polymers used for the production of the polybutadiene latices A, B and/or C are preferably polybutadiene polymers (for example polybutadiene, butadiene/styrene copolymers, butadiene/acrylonitrile copolymers or optionally crosslinked (co)polymers of the abovementioned monomers). It is also possible in principle to use other fine-particle latex polymers, for example polystyrene or styrene copolymers, polymethyl methacrylate or methyl methacrylate copolymers, and also polymers of other vinyl monomers. Preferred seed latex polymers are latices with at least 50% by weight polybutadiene content.

In a preferred embodiment, the polybutadiene latex A comprises:

from 50 to 100% by weight, preferably from 80 to 100% by weight, in particular from 90 to 100% by weight, of polybutadiene; and from 0 to 50% by weight, preferably from 0 to 20% by weight, with particular preference from 0 to 10% by weight, of butadiene-copolymerizable monomers (i.e. comonomers), preferably monomers selected from the group consisting of: styrene, acrylonitrile, isoprene, chloroprene, alpha-methylstyrene, $C_{1-4}$-alkylstyrenes, $C_{1-8}$-alkyl acrylates, $C_{1-8}$-alkyl methacrylates, alkylene glycol diacrylates, alkylene glycol dimethacrylates, divinylbenzene and combinations of two or more of the monomers mentioned, in particular styrene and/or acrylonitrile.

The polybutadiene latex A particularly preferably comprises:

from 90 to 100% by weight of polybutadiene; and
from 0 to 10% by weight of acrylonitrile and/or styrene copolymerized with the butadiene.

A preferred embodiment of the composition of a polybutadiene latex A can also be found in the experimental examples section below.

In a preferred embodiment, the polybutadiene latex B comprises:

from 50 to 100% by weight, preferably from 80 to 100% by weight, in particular from 90 to 100% by weight, of polybutadiene; and from 0 to 50% by weight, preferably from 0 to 20% by weight, with particular preference from 0 to 10% by weight, of butadiene-copolymerizable monomers (i.e. comonomers), preferably monomers selected from the group consisting of styrene, acrylonitrile, isoprene, chloroprene, alpha-methylstyrene, $C_{1-4}$-alkylstyrenes, $C_{1-8}$-alkyl acrylates, $C_{1-8}$-alkyl methacrylates, alkylene glycol diacrylates, alkylene glycol dimethacrylates, divinylbenzene and combinations of two or more thereof, in particular styrene and/or acrylonitrile.

It is particularly preferable that the polybutadiene latex B comprises:

from 90 to 100% by weight of polybutadiene; and from 0 to 10% by weight of acrylonitrile and/or styrene copolymerized with the butadiene.

A particularly preferred embodiment of the composition of a polybutadiene latex B can also be found in the experimental examples section below.

In a preferred embodiment, the polybutadiene latex C likewise comprises:
from 50 to 100% by weight, preferably from 80 to 100% by weight, in particular from 90 to 100% by weight, of polybutadiene; and
from 0 to 50% by weight, preferably from 0 to 20% by weight, with particular preference from 0 to 10% by weight, of butadiene-copolymerizable monomers (i.e. comonomers), preferably monomers selected from the group consisting of styrene, acrylonitrile, isoprene, chloroprene, alpha-methylstyrene, $C_{1-4}$-alkylstyrenes, $C_{1-8}$-alkyl acrylates, $C_{1-8}$-alkyl methacrylates, alkylene glycol diacrylates, alkylene glycol dimethacrylates, divinylbenzene and combinations of two or more thereof, in particular styrene and/or acrylonitrile.

It is particularly preferable that the polybutadiene latex C comprises:
from 90 to 100% by weight of polybutadiene; and
from 0 to 10% by weight of acrylonitrile and/or styrene copolymerized with the butadiene.

A particularly preferred embodiment of the composition of a polybutadiene latex C can also be found in the experimental examples section below.

In a preferred embodiment, the polybutadiene latices A, B and C are respectively (mutually independently) composed of:
from 50 to 100% by weight, preferably from 80 to 100% by weight, in particular from 90 to 99% by weight, of polybutadiene; and from 0 to 50% by weight, preferably from 0 to 20% by weight, in particular from 1 to 10% by weight, of butadiene-copolymerizable monomers, preferably monomers selected from the group consisting of styrene, acrylonitrile, isoprene, chloroprene, alpha-methylstyrene, $C_{1-4}$-alkylstyrenes, $C_{1-8}$-alkyl acrylates, $C_{1-8}$-alkyl methacrylates, alkylene glycol diacrylates, alkylene glycol dimethacrylates, divinylbenzene and combinations of two or more thereof, in particular styrene and/or acrylonitrile.

It is particularly preferable that the polybutadiene latices A, B and C respectively (mutually independently) comprise: from 90 to 100% by weight of polybutadiene; and from 0 to 10% by weight of acrylonitrile and/or styrene copolymerized with the butadiene.

Particularly preferred, but non-limiting, embodiments of the composition of the polybutadiene latices A, B and C can also be found in the experimental examples section below.

As can be seen above, production of the polybutadiene latex A and of the polybutadiene latex B preferably respectively (mutually independently) uses, as seed latices, polybutadiene latex C with average particle diameter $d_{50}$ from 10 to 220 nm, preferably from 20 to 210 nm and particularly preferably from 30 to 200 nm.

The ratio to one another by weight of the solids of the polybutadiene latices A and B can vary widely. In principle, any desired ratio by weight is possible.

In a preferred embodiment, the A:B ratio by weight of the solids of the polybutadiene latices is from 90:10 to 10:90, preferably from 80:20 to 20:80, in particular from 60:40 to 40:60.

The ratio by weight in this context is based on the solids of the polybutadiene latices. These can by way of example be determined gravimetrically after drying (for example at from 50 to 150° C. for from 5 to 60 min, for example at 180° C. for by way of example 23 minutes in a convection oven).

A preferred embodiment of the ratio A:B by weight of the solids of the polybutadiene latices can also be found in the experimental examples section below.

The ratio by weight of the graft rubbers P-I and P-II to one another can also be varied widely. Any desired ratio by weight is in principle possible.

In a preferred embodiment, the P-I:P-II ratio by weight of the graft rubbers is from 90:10 to 10:90, preferably from 80:20 to 20:80, in particular from 70:30 to 35:65. The P-I:P-II ratio by weight of the graft rubbers is particularly preferably from 55:45 to 60:40.

In this context, again, the ratio by weight is based on the solids of the polybutadiene latices. These can by way of example be determined gravimetrically after drying (for example at from 100 to 200° C. for from 5 to 60 min, for example at 180° C. for by way of example 23 minutes in a convection oven).

A particularly preferred embodiment of the ratio by weight of the solids of the polybutadiene latices P-I:P-II can also be found in the experimental examples section below.

In a preferred embodiment, the graft rubber P-I comprises, or consists of: from 15 to 60% by weight, in particular from 20 to 50% by weight, of styrene and acrylonitrile in a styrene:acrylonitrile ratio by weight of from 95:5 to 50:50, where styrene and/or acrylonitrile can be replaced entirely or to some extent by alpha-methylstyrene, methyl methacrylate, N-phenylmaleimide or a mixture thereof; and
from 40 to 85% by weight, in particular from 50 to 80% by weight, of the polybutadiene latices A and B.

It is particularly preferable that the graft rubber P-I consists of:
from 20 to 50% by weight of styrene and acrylonitrile in a styrene:acrylonitrile ratio by weight of from 80:20 to 65:35; and from 50 to 80% by weight of polybutadiene latices A and B.

It is particularly preferable that the graft rubber P-I consists of:
from 20 to 50% by weight of styrene and acrylonitrile in a styrene:acrylonitrile ratio by weight of from 80:20 to 65:35; and from 50 to 80% by weight of polybutadiene latices A and B, where the A:B ratio by weight of the solids of the polybutadiene latices is from 60:40 to 40:60.

A preferred embodiment of the composition of the graft rubber P-I can also be found in the experimental examples section below.

The graft rubber P-II preferably likewise comprises, or the graft rubber P-II consists of:
from 15 to 60% by weight, in particular from 20 to 50% by weight, of styrene and acrylonitrile in a styrene:acrylonitrile ratio by weight of from 95:5 to 50:50, where styrene and/or acrylonitrile can be replaced entirely or to some extent by alpha-methylstyrene, methyl methacrylate, N-phenylmaleimide or a mixture thereof; and from 40 to 85% by weight, in particular from 50 to 80% by weight, of polybutadiene latex C.

It is particularly preferable that the graft rubber P-II consists of:
from 20 to 50% by weight of styrene and acrylonitrile in a styrene:acrylonitrile ratio by weight of from 80:20 to 65:35; and from 50 to 80% by weight of polybutadiene latex C.

A particularly preferred embodiment of the composition of the graft rubber P-II can also be found in the experimental examples section below.

In a preferred embodiment, the graft rubbers P-I and P-II consist respectively (mutually independently) of:

from 15 to 60% by weight, in particular from 20 to 50% by weight, of styrene and acrylonitrile in a ratio by weight of from 95:5 to 50:50, where styrene can be replaced entirely or to some extent by alpha-methylstyrene, and where acrylonitrile can be replaced entirely or to some extent by methyl methacrylate or N-phenylmaleimide or a mixture thereof; and from 40 to 85% by weight, in particular from 50 to 80% by weight, of the polybutadiene latices.

It is preferable here that the styrene:acrylonitrile ratio by weight is in the range from 80:20 to 65:35, where styrene and/or acrylonitrile can be replaced entirely or to some extent by copolymerizable monomers, preferably by α-methylstyrene, methyl methacrylate or N-phenylmaleimide. It is also in principle possible to make additional concomitant use of quantities up to about 10% by weight (based on the total quantity of the monomers) of any desired other copolymerizable vinyl monomers.

It is particularly preferable that the graft rubbers P-I and P-II consist of:
from 20 to 50% by weight of styrene and acrylonitrile in a styrene:acrylonitrile ratio by weight of from 80:20 to 65:35; and from 50 to 80% by weight of polybutadiene latices A, B and C.

It is particularly preferable that the graft rubbers P-I and P-II consist of:
from 20 to 50% by weight of styrene and acrylonitrile in a styrene:acrylonitrile ratio by weight of from 80:20 to 65:35; and from 50 to 80% by weight of polybutadiene latices A, B and C, where the A:B ratio by weight of the solids of the polybutadiene latices is from 60:40 to 40:60.

A particularly preferred embodiment of the composition of the graft rubbers P-I and P-II can also be found in the experimental examples section below.

The graft rubbers P-I and P-II are typically produced by means of emulsion polymerization by means of persalt initiation. The persalt initiation can in principle be achieved with any desired persalts.

In a preferred embodiment, the inorganic persalt initiation respectively comprises (mutually independently) addition of one or more salts selected from the group consisting of ammonium persulfate, sodium persulfate, potassium persulfate, potassium perphosphate, sodium perborate and mixtures of two or more thereof. The terms "persulfate" and "peroxodisulfate" here are to be understood as synonyms. In a preferred embodiment, the inorganic persalt initiation comprises respectively (mutually independently) addition of sodium persulfate and/or potassium persulfate. This is also illustrated by way of example in the experimental examples section below.

The thermoplastic molding composition F can comprise any desired quantities of the graft rubbers P-I and P-II (used as coprecipitated mixture of these: P-I/P-II). It is preferable that the thermoplastic molding composition F comprises from 1 to 60 parts by weight, in particular from 5 to 50 parts by weight, of total composition of graft rubbers P-I and P-II (i.e. of the mixture P-I/P-II). The parts by weight here are based on 100 parts by weight of components I+II+III (i.e. of the entire composition of the graft rubbers P-I and P-II (mixture P-I/P-II) and of the rubber-free copolymer P-III).

The thermoplastic molding composition F can comprise any desired quantities of the rubber-free copolymer P-III. It is preferable that the thermoplastic molding composition F comprises from 40 to 99 parts by weight, in particular from 50 to 95 parts by weight, of rubber-free copolymer P-III. The parts by weight here are based on 100 parts by weight of components I+II+III (i.e. of the entire composition of the graft rubbers P-I and P-II (mixture P-I/P-II) and of the rubber-free copolymer P-III).

It is more preferable that the thermoplastic molding composition F comprises from 1 to 60 parts by weight, in particular from 5 to 50 parts by weight, of total composition of graft rubbers P-I and P-II (mixture P-I/P-II) and from 40 to 99 parts by weight, in particular from 50 to 95 parts by weight, of rubber-free copolymer P-III. The parts by weight here are preferably based on 100 parts by weight of components I+II+III (i.e. of the entire composition of the graft rubbers P-I and P-II (mixture P-I/P-II) and of the rubber-free copolymer P-III).

The thermoplastic molding composition F can moreover optionally comprise any desired quantities of thermoplastic components T not composed of vinyl monomers. The thermoplastic molding composition preferably comprises from 0 to 1000 parts by weight, preferably from 0 to 700 parts by weight, more preferably from 0 to 500 parts by weight, in particular from 0 to 100 parts by weight, of thermoplastic components T not composed of vinyl monomers. The parts by weight here are based on 100 parts by weight of components I+II+III (i.e. of the entire composition of the graft rubbers P-I and P-II (mixture P-I/P-II) and of the rubber-free copolymer P-III).

The thermoplastic molding composition F can moreover optionally comprise any desired quantities of additives D. It is preferable that the thermoplastic molding composition F comprises from 0 to 50 parts by weight of additives D. Here again, the parts by weight are based on 100 parts by weight of components I+II+III (i.e. of the entire composition of the graft rubbers P-I and P-II (mixture P-I/P-II) and of the rubber-free copolymer P-III).

In a preferred embodiment, the thermoplastic molding composition F comprises, or the thermoplastic molding composition F consists of:
(a) from 1 to 60 parts by weight, in particular from 5 to 50 parts by weight, of total composition of graft rubbers P-I and P-II;
(b) from 40 to 99 parts by weight, in particular from 50 to 95 parts by weight, of rubber-free copolymer P-III;
(c) from 0 to 1000 parts by weight, preferably from 0 to 700 parts by weight, more preferably from 0 to 500 parts by weight, in particular from 0 to 100 parts by weight, of thermoplastic components T not composed of vinyl monomers; and
(d) from 0 to 50 parts by weight of additives D.

It is preferable that the thermoplastic molding composition F comprises, or that the thermoplastic molding composition F consists of:
(a) from 1 to 60% by weight, in particular from 5 to 50% by weight, of total composition of graft rubbers P-I and P-II;
(b) from 40 to 99% by weight, in particular from 50 to 95% by weight, of rubber-free copolymer P-III;
(c) from 0 to 59% by weight, preferably from 0 to 50% by weight, more preferably from 0 to 25% by weight, in particular from 0 to 10% by weight, of thermoplastic components T not composed of vinyl monomers; and
(d) from 0 to 10% by weight, preferably from 0 to 5% by weight of additives D.

It is preferable that the thermoplastic molding composition F consists of:
(a) from 5 to 50% by weight of total composition of graft rubbers P-I and P-II;
(b) from 50 to 95% by weight of rubber-free copolymer P-III;

(c) from 0 to 10% by weight of thermoplastic components T not composed of vinyl monomers; and (d) from 0 to 5% by weight of additives D.

A preferred embodiment of the composition of the thermoplastic molding composition F can also be found in the experimental examples section below.

Additives D that can be added to the thermoplastic molding composition F are any desired polymer additives known for this purpose in the prior art.

By way of example, the additive can be selected from the group consisting of antioxidants, UV stabilizers, substances that decompose peroxide, antistatic agents, lubricants, mold-release agents, flame retardants, fillers and reinforcing materials (glass fibers, carbon fibers, etc.), colorants and combinations of two or more thereof.

The present invention moreover provides a process for the production of the thermoplastic molding composition F of the invention.

In this process of the invention, polybutadiene latices A and B are obtained by seed polymerization with use of at least one polybutadiene latex C (preferably with average particle diameter $d_{50}$ from 10 to 220 nm) as seed latex, and the graft rubber P-II is obtained by graft polymerization in the presence of at least one polybutadiene latex C used as seed latex for the polybutadiene latices A and B, characterized in that the graft rubbers P-I and P-II are produced by coprecipitation after mixing of the graft rubbers P-I and P-II (i.e. coprecipitation of the mixture P-I/P-II).

In a preferred embodiment, the thermoplastic molding composition F comprises the following components (or the thermoplastic molding composition F consists of the following components):

I) at least one graft rubber P-I obtained by emulsion polymerization with inorganic persalt initiation and polymerization of styrene and acrylonitrile in a styrene:acrylonitrile ratio by weight of from 80:20 to 65:35, in the presence of:

at least one polybutadiene latex A with average particle diameter $d_{50}$ from 250 to 310 nm and gel content from 45 to 70% by weight, and at least one polybutadiene latex B with average particle diameter $d_{50}$ from 360 to 460 nm and gel content from 55 to 90% by weight, where the polybutadiene latices A and B have been obtained by means of seed polymerization starting from a polybutadiene latex C with average particle diameter $d_{50}$ from 30 to 200 nm and gel content from 50 to 92% by weight (as seed latex), where the A:B ratio by weight of the solids of the polybutadiene latices is from 60:40 to 40:60;

II) at least one graft rubber P-II obtained by emulsion polymerization with inorganic persalt initiation and polymerization of styrene and acrylonitrile in a styrene:acrylonitrile ratio by weight of from 80:20 to 65:35 in the presence of the polybutadiene latex C with average particle diameter $d_{50}$ from 30 to 200 nm and gel content from 50 to 92% by weight;

III) at least one rubber-free copolymer matrix P-III made of styrene and acrylonitrile in a styrene:acrylonitrile ratio by weight of from 80:20 to 65:35;

IV) optionally one or more thermoplastic components T not composed of vinyl monomers; and V) optionally one or more additives D, where the process of the production of the graft rubbers P-I and P-II is completed via coprecipitation of a mixture of the respective emulsions comprising P-I and P-II, where the P-I:P-II ratio by weight of the graft rubbers is from 70:30 to 35:65, where the inorganic persalt initiation preferably respectively comprises (mutually independently) addition of one or more salts selected from the group consisting of ammonium persulfate, sodium persulfate, potassium persulfate, potassium perphosphate, sodium perborate and mixtures of two or more thereof, in particular sodium persulfate and/or potassium persulfate, and where the polybutadiene latices A, B and C optionally respectively (independently) are composed of:

from 80 to 100% by weight (in particular from 90 to 99% by weight) of butadiene; and from 0 to 20% by weight (in particular from 1 to 10% by weight) of butadiene-copolymerizable monomers.

The thermoplastic molding composition F preferably comprises from 2.5 to 35% by weight, in particular from 12.5 to 21% by weight, of at least one graft rubber P-I of the present invention.

The thermoplastic molding composition F preferably comprises from 2 to 22.5% by weight, in particular from 10 to 13.5% by weight, of at least one graft rubber P-II of the present invention.

The thermoplastic molding composition F preferably comprises from 22.5 to 95.5% by weight, in particular from 60.5 to 77.5% by weight, of at least one rubber-free copolymer matrix P-III of the present invention.

The thermoplastic molding composition F preferably comprises no more than 10% by weight, in particular (substantially) no, thermoplastic components T not composed of vinyl monomers.

The thermoplastic molding composition F preferably comprises no more than 10% by weight, in particular no more than 5% by weight, or (substantially) no, additive D.

It is more preferable that the thermoplastic molding composition F comprises (or that the thermoplastic molding composition F consists of):

I) from 2.5 to 35% by weight, in particular from 12.5 to 21% by weight, of at least one graft rubber P-I of the present invention;

II) from 2 to 22.5% by weight, in particular from 10 to 13.5% by weight, of at least one graft rubber P-II of the present invention;

III) from 22.5 to 95.5% by weight, in particular from 60.5 to 77.5% by weight, of at least one rubber-free copolymer matrix P-III of the present invention;

IV) from 0 to 10% by weight, in particular from 0% by weight, of one or more thermoplastic components T not composed of vinyl monomers; and V) from 0 to 10% by weight, in particular from 0 to 5% by weight, of one or more additives D.

It is still more preferable that the thermoplastic molding composition F comprises (or that the thermoplastic molding composition F consists of):

I) from 12.5 to 21% by weight of at least one graft rubber P-I of the present invention;

II) from 10 to 13.5% by weight of at least one graft rubber P-II of the present invention;

III) from 60.5 to 77.5% by weight of at least one rubber-free copolymer matrix P-III of the present invention; and V) from 0 to 5% by weight of one or more additives D.

It is preferable that the thermoplastic molding composition F of the present invention consists of:

I) from 2.5 to 35% by weight, in particular from 12.5 to 21% by weight, of at least one graft rubber P-I obtained by emulsion polymerization of from 20 to 50% by weight of styrene and acrylonitrile in a styrene:acrylonitrile ratio by weight of from 80:20 to 65:35 by means of inorganic persalt initiation,
in the presence of from 50 to 80% by weight of polybutadiene latices A and B, where the A:B ratio by weight of the solids of the polybutadiene latices is from 60:40 to 40:60, where
the polybutadiene latex A has an average particle diameter $d_{50}$ of from 250 to 310 nm and gel content of from 45 to 70% by weight and
the polybutadiene latex B has an average particle diameter $d_{50}$ of from 360 to 460 nm and gel content of from 55 to 90% by weight,
where the polybutadiene latices A and B have been obtained by seed polymerization of a polybutadiene latex C with average particle diameter $d_{50}$ from 10 to 220 nm as seed latex;

II) from 2 to 22.5% by weight, in particular from 10 to 13.5% by weight, of at least one graft rubber P-II obtained by emulsion polymerization of styrene and acrylonitrile in a styrene:acrylonitrile ratio by weight of from 80:20 to 65:35 by means of inorganic persalt initiation, in the presence of the polybutadiene latex C with average particle diameter $d_{50}$ from 10 to 220 nm, where the polybutadiene latex C has an average particle diameter $d_{50}$ of from 30 to 200 nm and gel content from 50 to 92% by weight;

III) from 22.5 to 95.5% by weight, in particular from 60.5 to 77.5% by weight, of at least one rubber-free copolymer matrix P-III made of styrene and acrylonitrile in a styrene:acrylonitrile ratio by weight of from 80:20 to 65:35;

IV) from 0 to 10% by weight, in particular of 0% by weight, of one or more thermoplastic components T not composed of vinyl monomers; and V) from 0 to 10% by weight, in particular of 0 to 5% by weight, of one or more additives D, where the process of production of the graft rubbers P-I and P-II is completed via coprecipitation of a mixture of the respective emulsions comprising P-I and P-II (mixture P-I/P-II), where the P-I:P-II ratio by weight is preferably from 70:30 to 35:65.

Another aspect of the present invention provides a process for the production of a thermoplastic molding composition F, comprising the following steps:

(i) provision of at least one polybutadiene latex C with average particle diameter $d_{50}$ from 10 to 220 nm;

(ii) production of at least one polybutadiene latex A with average particle diameter $d_{50}$ from 230 to 330 nm and at least one polybutadiene latex B with average particle diameter d50 from 340 to 480 nm by seed polymerization on the polybutadiene latex C from step (i);

(iii) production of a graft rubber P-I by emulsion polymerization of styrene and acrylonitrile in a ratio by weight of from 95:5 to 50:50, by means of inorganic persalt initiation, where styrene can be replaced entirely or to some extent by alpha-methylstyrene, and where acrylonitrile can be replaced entirely or to some extent by methyl methacrylate or N-phenylmaleimide, in the presence of the polybutadiene latices A and B from step (ii);

(iv) production of a graft rubber P-II by emulsion polymerization of styrene and acrylonitrile in a ratio by weight of from 95:5 to 50:50, by means of inorganic persalt initiation, where styrene can be replaced entirely or to some extent by alpha-methylstyrene, and where acrylonitrile can be replaced entirely or to some extent by methyl methacrylate or N-phenylmaleimide, in the presence of the polybutadiene latex C;

(v) mixing of the emulsions made of the graft rubbers P-I and P-II from steps (iii) and (iv);

(vi) coprecipitation of the graft rubbers P-I and P-II from the emulsion, from step (v), which comprises these graft rubbers P-I and P-II;

(vii) isolation of the coprecipitated graft rubbers P-I and P-II from step (vi) by filtration or centrifugation;

(viii) drying of the isolated coprecipitated graft rubbers P-I and P-II from step (vii); and (ix) at from 200 to 300° C., mixing of the dried coprecipitated graft rubbers P-I and P-II from step (viii) with at least one rubber-free copolymer matrix P-III made of styrene and acrylonitrile in a ratio by weight of from 95:5 to 50:50, where styrene can be replaced entirely or to some extent by alpha-methylstyrene.

All of the definitions and characterizations provided herein and in particular those related to the molding composition F of the invention, are also applicable in relation to the process of the invention.

A preferred embodiment of a production process for the purposes of the present invention can also be found in the experimental examples section below. This also provides the substeps of the process revealed herein. In a preferred embodiment, the thermoplastic molding composition F produced by the process of the invention has the features as per the present invention.

The process can generally be carried out at normal atmospheric pressure of about 1 atm. The person skilled in the art will immediately understand that other pressure conditions can occasionally arise locally as a result of shear forces, liquid columns and/or pumping procedures in the vessels and technical systems used. However, other pressure conditions can be used.

The provision of at least one polybutadiene latex C in step (i) can be achieved in any desired manner. The preferred properties of the polybutadiene latex C have been described in some detail above. The polybutadiene latex C can optionally be purchased. It is also possible that, as described above, the polybutadiene latex C is itself produced by seed polymerization.

Production of at least one polybutadiene latex A and of at least one polybutadiene latex B (step (ii)) is achieved by seed polymerization onto the polybutadiene latex C from step (i). Any of the processes known in the prior art can be used for this purpose. The seed polymerization preferably takes place as described above.

Production of a graft rubber P-I (step (iii)), and also of a graft rubber P-II (step (iv)) also preferably takes place as described above.

In a preferred embodiment, styrene monomers and acrylonitrile monomers are added continuously to the polybutadiene latices A and B in step (iii) for production of a graft rubber P-I.

Additionally or alternatively, styrene monomers and acrylonitrile monomers are added continuously to polybutadiene latex C in step (iv) for production of a graft rubber P-II.

In a preferred embodiment, styrene monomers and acrylonitrile monomers are added continuously to the polybutadiene latices A and B and, respectively, polybutadiene latex C in step(s) (iii) and/or (iv) of the production of a graft rubber P-I and/or P-II.

In a more preferred embodiment, styrene monomers and acrylonitrile monomers are respectively added continuously to the polybutadiene latices A, B and C in steps (iii) and (iv) for production of the graft rubbers P-I and P-II.

Any desired processes can be used to carry out the graft polymerizations for the production of the graft rubbers P-I and P-II. They are preferably carried out in a manner such that the monomer mixture is continuously added to the mixture of the polybutadiene latices A and B and, respectively, to the polybutadiene latex C, and polymerized. It is preferable here that specific monomer/rubber ratios are maintained and that the monomers are added in a known manner to the rubber.

It is particularly preferable that styrene monomers and acrylonitrile monomers are added continuously to the corresponding polybutadiene latices A and B and, respectively, C in steps (iii) and (iv) for production of a graft rubber P-I and P-II.

It is in principle possible here that in step(s) (iii) and/or (iv), over the entire feed time, that the monomer feed remains uniform, increases, decreases, or exhibits any desired other feed profile. In a particularly preferred embodiment, the monomer feed within the first half of the monomer feed time amounts to from 55 to 90% by weight, more preferably from 60 to 80% by weight, in particular from 65 to 75% by weight. The remaining proportion of monomer is then added within the second half of the total monomer addition time.

It is also possible to use molecular-weight regulators during the graft polymerization, preferred quantities therefrom being from 0.01 to 2% by weight, particularly from 0.05 to 1% by weight (based in each case on the total quantity of monomer in the graft polymerization stage). Examples of suitable molecular-weight regulators are alkyl mercaptans, for example n-dodecyl mercaptan, tert-dodecyl mercaptan, dimeric α-methylstyrene and/or terpinols.

The polymerization temperature during the steps is preferably from 25° C. to 160° C., in particular from 40° C. to 90° C.

Suitable emulsifiers have been mentioned above. Conventional temperature control, e.g. isothermal, can be used here; however, it is preferable to carry out the graft polymerization in a manner such that the temperature difference between start and end of the reaction is at least 10° C., preferably at least 15° C. and particularly preferably at least 20° C. It is more preferable that the temperature rises by at least 10° C. during the course of the polymerization, preferably at least 15° C. or at least 20° C., for example from a temperature of from 55 to 65° C. to a temperature of from 75 to 85° C. However, it is also possible to maintain a temperature, for example a temperature in the range from 55 to 85° C.

The reaction conditions in step (iii) and step (iv) can optionally be identical, similar or different.

The emulsion polymerization is preferably carried out within the period of from 30 min to two days, more preferably within a period of from 1 to 24 h, in particular from 2 to 10 h, for example from 3 to 7 h. This can be followed by a post-polymerization period without further monomer feed, in order to increase yield from the reaction.

The graft polymers P-I and/or P-II can optionally be dried after the graft polymerization reaction, for example at a temperature of from 50 to 200° C., preferably from 100 to 200° C., in particular from 150 to 190° C. The drying process can take from 5 min to 24 h, preferably from 10 min to 12 h, in particular from 15 min to 1 h.

The process of production of the graft rubbers P-I and P-II thus synthesized by emulsion polymerization is then completed in the invention via coprecipitation of the graft rubbers P-I and P-II from the mixture P-I/P-II thereof. In order to prevent thermal degradation of the graft rubbers during completion of the production process (comprising the steps (v)-(ix) of mixing of the emulsions, coprecipitation of the graft rubbers P-I and P-II from the mixed emulsion (mixture P-I/P-II), isolation, drying and mixing of the coprecipitated graft rubbers P-I and P-II (i.e. the mixture P-I/P-II) with at least one rubber-free copolymer matrix P-III and optionally with other components), and in order to permit reliable and safe completion of the process of production, protected additions can optionally be admixed before or during one, or in the desired number, of the steps (v), (vi), (vii), (viii) and/or (ix). By way of example, it is possible to admix one or more antioxidants (e.g. one or more phenolic antioxidants) and/or any other desired substances which increase the thermal stability of the graft rubbers. These can by way of example be added in the form of one or more emulsions or dispersions to the graft rubbers P-I and P-II and mixed with the latter by stirring.

The graft rubber P-I and/or the graft rubber P-II can optionally also be coagulated by any desired means. By way of example, coagulation can be achieved by use of an electrolyte solution (e.g. a salt solution, an acid solution or a salt solution and acid solution). By way of example, coagulation can be achieved by use of a magnesium sulfate/sulfuric acid solution (e.g. comprising 1% by weight of magnesium sulfate and 0.07% by weight of sulfuric acid in water). The proportion of graft rubber P-I and, respectively, P-II in precipitated dispersion here can be, for example, from 5 to 50% by weight, preferably from 10 to 30% by weight, in particular from 15 to 20% by weight.

By way of example, the electrolyte solution can be used as initial charge and graft rubber P-I and, respectively, P-II can be added. The mixture can then optionally be heated, for example to a temperature of from 50 to 99° C., preferably from 80 to 99° C., in particular from 90 to 98° C. The coagulation is described by way of example in the experimental examples section below.

The step (v) of the mixing of the emulsions comprising the graft rubbers P-I and P-II can be achieved in any desired manner. It is preferable that the mixing comprises homogeneous mixing of the graft rubbers P-I and P-II. This can be achieved by way of example by use of a static mixer, stirring and/or shaking.

The step (v) of the mixing of the emulsions comprising the graft rubbers P-I and P-II can optionally also comprise initial or further coagulation. By way of example, coagulation can be achieved by use of an electrolyte solution (e.g. a salt solution, an acid solution or a salt solution and an acid solution). By way of example, coagulation can be achieved by means of a magnesium sulfate/sulfuric acid solution (e.g. comprising from 0.5 to 2% by weight, in particular from 0.75 to 1.5% by weight, of magnesium sulfate and optionally up to 0.2, in particular from 0.5 to 0.1% by weight, of sulfuric acid, for example 1% by weight of magnesium sulfate and 0.07% by weight of sulfuric acid in water). The total proportion of graft rubber P-I and P-II (i.e. of the mixture P-I/P-II) in the precipitated dispersion here can be, for example, from 5 to 50% by weight, preferably from 10 to 30% by weight, in particular from 15 to 20% by weight.

The step (vi) of the coprecipitation of the graft rubbers P-I and P-II from the emulsion (mixture P-I/P-II) comprising these graft rubbers P-I and P-II can be achieved by using any desired means known in the prior art.

In a preferred embodiment, the coprecipitation in step (vi) comprises:
a) with simultaneous mixing by stirring, the action of aqueous electrolyte solutions, preferably those comprising:
one or more salts selected from the group consisting of magnesium sulfate, kieserite, pentahydrite, hexahydrite, epsomite (epsom salt), calcium chloride, sodium chloride and mixtures of two or more thereof and/or one or more acids, in particular sulfuric acid and/or acetic acid;
b) the action of temperatures of from 20 to 150° C., preferably from 40 to 100° C., in particular from 45 to 99° C.;
c) the action of shear forces; and/or
d) drying, in particular spray drying.

It is more preferable that the coprecipitation in step (vi) comprises, with simultaneous mixing by stirring, action of aqueous electrolyte solutions, preferably those comprising one or more salts, in particular one or more salts selected from the group consisting of magnesium sulfate, kieserite, pentahydrite, hexahydrite, epsomite (epsom salt), calcium chloride, sodium chloride and mixtures of two or more thereof and/or
one or more acids, in particular sulfuric acid and/or acetic acid.

In a preferred embodiment, the coprecipitation in step (vi) comprises, with simultaneous mixing by stirring, action of aqueous electrolyte solutions which comprise one or more salts and one or more acids.

In another preferred embodiment, the coprecipitation in step (vi) comprises, with simultaneous mixing by stirring, action of aqueous electrolyte solutions, preferably those comprising one or more salts selected from the group consisting of magnesium sulfate, kieserite, pentahydrite, hexahydrite, epsomite (epsom salt), and mixtures of two or more thereof and at least one of the acids sulfuric acid and acetic acid.

In a preferred embodiment, coagulation and/or coprecipitation is achieved by use of a magnesium-sulfate-containing electrolyte solution, preferably by means of an electrolyte solution comprising from 0.5 to 2% by weight, in particular from 0.75 to 1.5% by weight, of magnesium sulfate and optionally up to 0.2, in particular from 0.5 to 0.1% by weight, of sulfuric acid, for example 1% by weight of magnesium sulfate and 0.07% by weight of sulfuric acid in water.

The coprecipitation in step (vi) preferably comprises, with simultaneous mixing by stirring, action of aqueous electrolyte solutions comprising one or more salts selected from the group consisting of magnesium sulfate, kieserite, pentahydrite, hexahydrite, epsomite (epsom salt) and mixtures of two or more thereof and sulfuric acid.

The coprecipitation in step (vi) by action of one or more aqueous electrolyte solutions can be carried out continuously or batchwise.

In the case of the continuous operating mode, the precipitation can take place in one, or preferably in at least two, or particularly preferably in at least three, or very particularly preferably in at least four, continuously operated stirred vessel(s).

The coprecipitation in step (vi) can take place at any suitable temperature. It is preferable that this step (vi) is carried out in the temperature range from 20 to 150° C. It is more preferable that this step (vi) is carried out in the temperature range from 40 to 100° C. It is particularly preferable that this step (vi) is carried out in the temperature range from 45 to 99° C.

The step of coprecipitation of the graft rubbers P-I and P-II (from the mixture P-I/P-II thereof) is followed by the step of isolation of the coprecipitated graft rubbers P-I and P-II by filtration or centrifugation (step (vii)). Here, the coprecipitated graft rubbers P-I and P-II are (substantially) isolated from the reaction medium (for example an aqueous electrolyte solution). Filtration can optionally be vacuum filtration or other filtration. Isolation can also optionally be achieved by a combination of filtration and centrifugation. A water-moist graft rubber mixture comprising P-I and P-II is thus obtained.

In the next step (viii), the (water-)moist graft rubber mixture comprising P-I and P-II is then dried. This can be achieved by way of example by means of a convection oven or vacuum oven. The drying can by way of example take place at a temperature of from 50 to 200° C., preferably at a temperature of 50 to 100° C.

As described above, materials that can optionally also be added to the graft rubbers P-I and P-II (used as mixture P-I/P-II thereof) and to the one or more rubber-free copolymers P-III during the step (ix) of mixing of the components with one another are one or more thermoplastic components T not composed of vinyl monomers and/or one or more additives D. The components mixed here can be in completely or substantially dry form. Alternatively, they can also be in moist form when mixed, or in a form comprising residual moisture.

The step (ix) of the mixing of the components with one another can in principle be achieved in any manner suitable for this purpose and at any suitable temperature. The temperature at which the mixing of the components with one another is achieved is preferably from 100° C. to 400° C., more preferably from 150° C. to 350° C., in particular from 200° C. to 300° C. Alternatively, compounding at a temperature of from 15° C. to 100° C. is also possible, for example at (about) 20° C. By way of example, the components can be mixed with one another in an optionally heated kneading reactor (e.g. internal mixer), an optionally heated extruder or an optionally heated twin-screw system. Other terms that can also be used here for mixing at elevated temperature are melt compounding and, respectively, melt extrusion. The step (ix) of mixing of the components with one another can take place sequentially or simultaneously. The components can therefore be added all at once or added in succession.

In a very preferred embodiment, the process for the production of a thermoplastic molding composition F comprises the following steps:
(i) provision of at least one polybutadiene latex C of the present invention (in particular as described above in the context of the thermoplastic molding composition F);
(ii) production of at least one polybutadiene latex A and of at least one polybutadiene latex B, respectively of the present invention (in particular as described above in the context of the thermoplastic molding composition F) by seed polymerization on the polybutadiene latex C from step (i);
(iii) production of a graft rubber P-I by emulsion polymerization of styrene and acrylonitrile in a ratio by weight of from 80:20 to 65:35 by means of inorganic persalt initiation, in the presence of the polybutadiene latices A and B from step (ii), where styrene monomers and acrylonitrile monomers are added continuously to the polybutadiene latices A and B and the quantity of the monomers of the monomer feed within the first half of the monomer feed time is from 65 to 75% by weight;
(iv) production of a graft rubber P-II by emulsion polymerization of styrene and acrylonitrile in a ratio by weight of from 80:20 to 65:35 by means of inorganic persalt initiation, in the presence of the polybutadiene latex C, where styrene monomers and acrylonitrile monomers are added continuously to the polybutadiene latex C and the quantity of the monomers of the monomer feed within the first half of the monomer feed time is from 65 to 75% by weight;
(v) mixing of the emulsions made of the graft rubbers P-I and P-II from steps (iii) and (iv);
(vi) coprecipitation of the graft rubbers P-I and P-II from the emulsion, from step (v), which comprises these graft rubbers P-I and P-II;
(vii) isolation of the coprecipitated graft rubbers P-I and P-II from step (vi) by filtration or centrifugation;
(viii) drying of the isolated coprecipitated graft rubbers P-I and P-II from step (vii); and;
(ix) at from 200 to 300° C., mixing of the dried coprecipitated graft rubbers P-I and P-II from step (viii) with at least one rubber-free copolymer matrix P-III made of styrene and acrylonitrile in a ratio by weight of from 80:20 to 65:35;
where the coprecipitation in step (vi) comprises (with simultaneous mixing by stirring) the action of aqueous electrolyte solutions, preferably those comprising:
one or more salts selected from the group consisting of magnesium sulfate, kieserite, pentahydrite, hexahydrite, epsomite (epsom salt), calcium chloride, sodium chloride and mixtures of two or more thereof and/or one or more acids, (in particular sulfuric acid and/or acetic acid), in particular magnesium sulfate-containing electrolyte solutions;
b) the action of temperatures of from 45 to 99° C.; and optionally
c) the action of shear forces; and optionally
d) drying.

A preferred method for completing the process of production after precipitation is mixing, as described in EP-A 867 463, of the moist graft rubbers P-I and P-II (i.e. of the mixture P-I/P-II) with a melt which is made of thermoplastic components and which comprises rubber-free graft polymer P-III and optionally thermoplastic component(s) T and/or additives D, in a kneading reactor. Additives D used here can be any desired polymer additives known from this purpose in the prior art. Thermoplastic components T used here can be any desired thermoplastic resins known for this purpose in the prior art. Examples of these have been mentioned above.

The thermoplastic molding composition F which is obtained by the process and which comprises the graft rubbers P-I and P-II (i.e. the mixture P-I/P-II), and also comprises rubber-free copolymer matrix P-III, is itself inventive and can be used for any desired purpose. By way of example, any desired moldings can be produced therefrom.

Another aspect of the present invention therefore provides moldings obtainable (or obtained) from a thermoplastic molding composition F of the present invention and/or obtainable (or obtained) by a process of the present invention. These moldings can by way of example be produced by injection molding, extrusion or blow-molding processes. Another type of processing is the production of moldings by thermoforming from prefabricated sheets or films, and the process of in-mold coating of films. Examples of these moldings are films, profiles, and housing parts of any type, for example for household devices such as juice presses, coffee machines, and mixers; for office equipment such as monitors, printers, and copiers; exterior and interior parts for automobiles; sheets, pipes, electrical ducting, windows, doors and other profiles for the construction sector (fitting-out of interiors and outdoor applications), and also electrical and electronic parts such as switches, plugs and plug sockets.

In particular, the molding compositions of the invention can also be used for the production of the following moldings: components for the fitting-out of interiors for rail vehicles, ships, aircraft, buses and other motor vehicles, external parts for bodywork in the motor vehicle sector, housings of electrical equipment comprising small transformers, housings for equipment for processing and transmission of information, medical-equipment housings and medical-equipment cladding, massage equipment and housings therefor, toy vehicles for children, sheet-like wall elements, housings for safety/security devices, thermally insulated transport containers, apparatus for the maintenance or care of small animals, moldings for sanitary and bathroom equipment, covering grids for ventilation openings, moldings for sheds and equipment stores, and housings for garden equipment.

The examples and claims revealed herein provide further clarification of the invention.

EXAMPLES

Graft Rubber P-I 30 parts by weight (calculated as solid) of an anionically emulsified polybutadiene latex which has been produced by free-radical emulsion polymerization with use of a polybutadiene seed latex with average particle diameter $d_{50}$ 113 nm (polybutadiene latex C) and which has an average particle diameter $d_{50}$ of 299 nm and gel content 60% by weight (polybutadiene latex A) and 30 parts by weight (calculated as solid) of an anionically emulsified polybutadiene latex which has been produced by free-radical emulsion polymerization with use of a polybutadiene seed latex with average particle diameter $d_{50}$ 113 nm (polybutadiene latex C, see below for production process) and which has an average particle diameter $d_{50}$ of 371 nm and gel content 82% by weight (polybutadiene latex B) were mixed with water until solids content was about 27% by weight, and the mixture was then heated to 60° C., and 0.25 part by weight of potassium persulfate (dissolved in water) was then admixed. 40 parts by weight of a mixture of 74.5% by weight of styrene, 25.5% by weight of acrylonitrile and 0.12 part by weight of tert-dodecyl mercaptan were then added uniformly within a period of 5 hours.

In parallel with the above, 1.3 parts by weight (calculated as solid substance) of the sodium salt of a resin acid mixture (commercially available product Burez DRS S70 E from Lawter BVBA, B-9130 Kallo, Belgium (specification data: acid number: 11 mg KOH/g, abietic acid content: <1%, dehydroabietic acid content: 38%), dissolved in alkaline water) were added over a period of 5 hours and 0.25 part by weight of potassium persulfate (dissolved in water) was likewise added over a period of 5 hours. During the course of the first 3 hours, the reaction temperature was raised from 60° C. to 81° C. Once all of the additions had ended, they were followed by two hours of post-reaction time at 81° C. The graft latex was then cooled to room temperature. The gravimetrically determined solids content of the graft rubber (dried for 23 minutes at 180° C. in a convection oven) was 34.9% by weight.

1.0 part by weight of a phenolic antioxidant (Irganox 1076, BASF SE), based on the solids content of the graft rubber, was added to a portion of the graft rubber, and mixed. A magnesium sulfate/sulfuric acid solution was then used for coagulation. The concentration of magnesium sulfate in the magnesium sulfate/sulfuric acid solution was 1% by weight, and the concentration of the sulfuric acid was 0.07% by weight. The concentration of the graft rubber P-I in the precipitated dispersion was 16% by weight. The coagulation was achieved by using the magnesium sulfate/sulfuric acid solution as initial charge and adding the stabilized graft rubber, with stirring, and then heating the mixture to 95° C.

The graft rubber P-I was isolated from the aqueous phase by vacuum filtration and washed with 1000 parts by weight of cold water (about 20° C.). The resultant moist powder was dried at 70° C. in a convection oven until residual moisture content was <1% by weight (gravimetric determination).

Graft Rubber P-II 51.5 parts by weight (calculated as solid) of an anionically emulsified polybutadiene latex which has been produced by free-radical seed polymerization with use of polybutadiene seed latex with average particle diameter $d_{50}$ 49 nm and which has an average particle diameter d50 of 113 nm and gel content 91% by weight (polybutadiene latex C, see below for production process) were mixed with water until solids content was about 27% by weight, and then the mixture was heated to 60° C. and 0.25 part by weight of potassium persulfate (dissolved in water) was admixed. 48.5 parts by weight of a mixture of 74.5% by weight of styrene, 25.5% by weight of acrylonitrile and 0.10 part by weight of tert-dodecyl mercaptan were then added uniformly within a period of 5 hours, and in parallel therewith 1 part by weight (calculated as solid substance) of the sodium salt of a resin acid mixture (commercially available product from Burez DRS S70 E from Lawter BVBA, B-9130 Kallo, Belgium (specification data: acid number: 11 mg KOH/g, abietic acid content: <1%, dehydroabietic acid content: 38%), dissolved in alkaline water) was added over a period of 5 hours, and 0.25 part by weight of potassium persulfate (dissolved in water) was added over a period of 5 hours. During the course of the first 3 hours, the reaction temperature was raised from 60° C. to 81° C. Once all of the additions had ended, they were followed by two hours of post-reaction time at 81° C., and then the graft latex was cooled to room temperature. The gravimetrically determined solids content of the graft rubber (dried for 23 minutes at 180° C. in a convection oven) was 34.2% by weight.

1.0 part by weight of a phenolic antioxidant (Irganox 1076, BASF SE), based on the solids content of the graft rubber, was added to a portion of the graft rubber, and mixed. A magnesium sulfate/sulfuric acid solution was then used for coagulation. The concentration of magnesium sulfate in the magnesium sulfate/sulfuric acid solution was 1% by weight, and the concentration of the sulfuric acid was 0.07% by weight. The concentration of the graft rubber in the precipitated dispersion was 16% by weight. The coagulation was achieved by using the magnesium sulfate/sulfuric acid solution as initial charge and adding the stabilized graft rubber, with stirring, and then heating the mixture to 95° C. The graft rubber P-II was isolated from the aqueous phase by vacuum filtration and washed with 1000 parts by weight of cold water (about 20° C.). The resultant moist powder was dried at 70° C. in a convection oven until residual moisture content was <1% by weight (gravimetric determination).

Coprecipitation of Graft Rubbers P-I and P-II

Portions of the graft rubbers P-I and P-II in a P-I:P-II ratio by weight of 57.53:42.47 (calculated as solid) were mixed by stirring to give the mixture P-I/P-II. 1.0% by weight of a phenolic antioxidant (Irganox 1076, BASF SE), based on the solids of the graft rubber mixture comprising the graft rubbers P-I and P-II, was added to this mixture and mixed. A magnesium sulfate/sulfuric acid solution was then used for coagulation. The concentration of magnesium sulfate in the magnesium sulfate/sulfuric acid solution was 1% by weight, and the concentration of the sulfuric acid was 0.07% by weight. The concentration of the graft rubber mixture comprising the graft rubbers P-I and P-II in the precipitated dispersion was 16% by weight. The coagulation was achieved by using the magnesium sulfate/sulfuric acid solution as initial charge and adding stabilized graft rubber mixture comprising the graft rubbers P-I and P-II (mixture P-I/P-II), with stirring, and then heating the mixture to 95° C. The graft rubbers P-I and P-II were isolated from the aqueous phase by vacuum filtration and washed with 1000 parts by weight of cold water. The resultant moist powder was dried at 70° C. in a convection oven until residual moisture content was <1% by weight (gravimetric determination).

Rubber-Free Copolymer Matrix P-III

Random styrene/acrylonitrile copolymer (styrene:acrylonitrile ratio by weight 73:27) with weight-average molar mass $M_w$ 106 000 g/mol and with number-average molar mass $M_n$ 15 000 g/mol was obtained by free-radical solution polymerization with peroxidic initiation, where the molar masses $M_w$ and $M_n$ were determined by gel permeation chromatography with tetrahydrofuran as solvent and polystyrene for calibration, and also with oligomer content with molar mass less than 1000 g/mol of 1.0% by weight, likewise determined by gel permeation chromatography with tetrahydrofuran as solvent and polystyrene for calibration. In relation to oligomers in random styrene/acrylonitrile copolymer, see: K. Kirchner, H. Schlapkohl, Makromol. Chem. 177 (1976) 2031-2042, "The Formation of Oligomers in the Thermal Copolymerization of the Styrene/Acrylonitrile-System".

The polymer components described above were mixed in the proportions stated in table 1 to give the molding compositions F1-F4 with 2 parts by weight of ethylenebisstearylamide, 0.30 part by weight of magnesium stearate and 0.15 part by weight of a polydimethylsiloxane with viscosity 1000 centistokes (cSt) in a ZSK 25 extruder (Coperion) and, after pelletization, processed to give moldings.

The following data were in particular determined:
  notched impact resistance at room temperature (ak RT) in accordance with ISO 180/1A (unit: $kJ/m^2$)
  impact resistance at room temperature (an RT) in accordance with ISO 180/1U (unit: $kJ/m^2$)
  thermoplastic flowability (MVR (220/10) for 220° C. and 10 kg load in accordance with ISO 1133, unit: $cm^3/10$ min)
  properties from a tensile test in accordance with EN ISO 527-1:1996
    tensile modulus of elasticity, modulus of elasticity $E_t$ (unit MPa)

tensile strength $\sigma_M$ (unit MPa)
tensile stress at break $\sigma_B$ (unit MPa)
yellowness Index in accordance with ASTM method E313-96
gloss at 20° in accordance with DIN 67530
The surface quality was determined by measuring the pimple count in the range <250 µm, 250-400 µm and >400 µm (unit 1/m²), where a lower pimple count indicates a better result. Surface studies for this purpose were carried out with a 25×25 L/D Collin extruder with attached FSA 100 cameras from OCS (OCS Optical Control Systems GmbH, Wullener Feld 24, 58454 Witten, Germany) with 50 µm resolution. For this purpose, the material was melted, extruded through a 150 mm slot die with 2.0 mm gap, passed through a plurality of guide rollers and wound up in the form of strip on a roll. During this procedure, the strip passed the cameras, where the particles of the surface were quantitatively analyzed in incident light. The inspected area on which the pimple count was measured here was 1.0 m².

The DIN, ASTM and ISO standards mentioned herein are preferably the most recent versions as at April 2015.

The test results of the molding compositions F1-F4 surprisingly showed that the polymer compositions F1 and F3 of the invention exhibit better impact resistance and notched impact resistance together with improved surface quality, while other properties are comparable with those of the molding compositions F2 and F4 not of the invention.

TABLE 1

(Constitution and test data for molding compositions F1-F4)

| Constitution | | Molding compositions | | | |
| --- | --- | --- | --- | --- | --- |
| | | F1 of the invention | F2 comparison | F3 of the invention | F4 comparison |
| Graft rubber P-I | [pts. by wt.] | | 17.259 | | 23.012 |
| Graft rubber P-II | [pts. by wt.] | | 12.741 | | 16.988 |
| Total of graft rubbers P-I and P-II | [pts. by wt.] | | 30.000 | | 40.000 |
| Coprecipitation mixture of graft rubbers P-I and P-II | [pts. by wt.] | 30.000 | | 40.000 | |
| Rubber-free copolymer matrix P-III | [pts. by wt.] | 70.000 | 70.000 | 60.000 | 60.000 |
| Ethylenebisstearylamide | [pts. by wt.] | 2.00 | 2.00 | 2.00 | 2.00 |
| Magnesium stearate | [pts. by wt.] | 0.30 | 0.30 | 0.30 | 0.30 |
| Polydimethylsiloxane [1000 cSt] | [pts. by wt.] | 0.15 | 0.15 | 0.15 | 0.15 |
| Total | [pts. by wt.] | 102.450 | 102.450 | 102.450 | 102.450 |
| Notched impact resistance at room temperature (ak RT) | [kJ/m²] | 13.8 | 12.5 | 22.3 | 19.8 |
| Impact resistance at room temperature (an RT) | [kJ/m²] | 43.9 | 37.0 | 97.1 | 45.0 |
| MVR (220° C./10 kg) | [mL/10 min] | 40.2 | 38.4 | 25.8 | 26.9 |
| Tensile modulus of elasticity $E_t$ | [MPa] | 2478 | 2481 | 2138 | 2148 |
| Tensile strength $\sigma_M$ | [MPa] | 46.7 | 46.7 | 41.5 | 41.8 |
| Tensile stress at break $\sigma_B$ | [MPa] | 44.2 | 42.6 | 32.9 | 35.6 |
| Pimple count <250 µm | [1/m²] | 112 | 154 | 94 | 120 |
| Pimple count 250-400 µm | [1/m²] | 67 | 105 | 71 | 113 |
| Pimple count >400 µm | [1/m²] | 34 | 42 | 43 | 70 |
| Gloss at 20° | | 96.2 | 96.9 | 95.7 | 95.6 |
| Yellowness Index | | 33.1 | 33.4 | 32.2 | 34.2 |

What is claimed is:

1. A thermoplastic molding composition F consisting of:
   (a) from 5 to 50% be weight, based on the total thermoplastic molding composition F, of a mixture of graft rubbers P-I and P-II of:
   P-I: at least one graft rubber P-I obtained by emulsion polymerization with inorganic persalt initiation and polymerization of styrene and acrylonitrile in a styrene:acrylonitrile ratio by weight of from 95:5 to 50:50, where styrene can be replaced entirely or to some extent by alpha-methylstyrene, and where acrylonitrile can be replaced entirely or to some extent by methyl methacrylate or N-phenylmaleimide, in the presence of:
   at least one polybutadiene latex A with average particle diameter $d_{50}$ from 230 to 330 nm and at least one polybutadiene latex B with average particle diameter $d_{50}$ from 340 to 480 nm,
   where the polybutadiene latices A and B have been obtained by seed polymerization starting from at least one polybutadiene latex C with average particle diameter $d_{50}$ from 10 to 220 nm (as seed latex);
   P-II: at least one graft rubber P-II obtained by emulsion polymerization with inorganic persalt initiation and polymerization of styrene and acrylonitrile in a styrene:acrylonitrile ratio by weight of from 95:5 to 50:50, where styrene can be replaced entirely or to some extent by alpha-methylstyrene, and where acrylonitrile can be replaced entirely or to some extent by methyl methacrylate or N-phenylmaleimide, in the presence of said at least one polybutadiene latex C with average particle diameter $d_{50}$ from 10 to 220 nm;
   (b) from 50 to 95% by weight, based on the total thermoplastic molding composition F, of at least one rubber-free copolymer matrix P-III made of styrene and acrylonitrile in a styrene:acrylonitrile ratio by weight of from 95:5 to 50:50, where styrene can be replaced entirely or to some extent by alpha-methylstyrene,
   (c) optionally from 0 to 10% by weight, based on the total thermoplastic molding composition F, of one or more thermoplastic components T not composed of vinyl monomers; and
   (d) optionally from 0 to 5% by weight, based on the total thermoplastic molding composition F, of one or more additives D,
   where the graft rubbers P-I and P-II are prepared in separate steps and mixed with each other to obtain mixture of the respective emulsions comprising P-I and P-II,
   where the process of production of the graft rubbers P-I and P-II is completed via coprecipitation of the mixture of respective emulsions comprising 5 to 30% by weight of the graft rubber mixture of P-I and P-II in an aqueous electrolyte solution containing one or more salts, one or more acids, or a combination of one or more salts and one or more acids, and
   wherein the mixture of coprecipitated graft rubbers P-I and P-II is mixed with the at least one rubber-free copolymer matrix P-III and optionally the one or more thermoplastic components T and optionally the one or more additives D.

2. The thermoplastic molding composition F as claimed in claim 1, where said thermoplastic molding composition F is characterized at least in one of the following:
   the graft rubber P-I has been obtained by emulsion polymerization of styrene and acrylonitrile in a ratio by weight of from 80:20 to 65:35 onto the polybutadiene latices A and B;
   the graft rubber P-II has been obtained by emulsion polymerization of styrene and acrylonitrile in a ratio by weight of from 80:20 to 65:35 onto the at least one polybutadiene latex C;
   the rubber-free copolymer matrix P-III is a styrene-acrylonitrile copolymer with a ratio by weight of from 80:20 to 65:35; and
   a combination of two or more thereof.

3. The thermoplastic molding composition F as claimed in claim 1, where the average particle diameter $d_{50}$ of the polybutadiene latex A is from 240 to 320 nm, and gel content of from 30 to 80% by weight.

4. The thermoplastic molding composition F as claimed in claim 1, where the average particle diameter $d_{50}$ of the polybutadiene latex B is from 350 to 470 nm, and gel content of from 50 to 95% by weight.

5. The thermoplastic molding composition as claimed in claim 1, where the average particle diameter $d_{50}$ of the at least one polybutadiene latex C is from 20 to 210 nm, and gel content of from 30 to 98% by weight.

6. The thermoplastic molding composition as claimed in claim 1, where the polybutadiene latices A, B and C are respectively composed of:
   from 50 to 100% by weight of butadiene; and
   from 0 to 50% by weight of butadiene-copolymerizable monomers.

7. The thermoplastic molding composition F as claimed in claim 1, where the ratio A:B by weight of the solids of the polybutadiene latices is from 90:10 to 10:90.

8. The thermoplastic molding composition F as claimed in claim 1, where the P-I:P-II ratio by weight of the graft rubbers is from 90:10 to 10:90.

9. The thermoplastic molding composition F as claimed in claim 1, where the graft rubbers P-I and P-II respectively consist of:
   from 15 to 60% by weight of styrene and acrylonitrile in a ratio by weight of from 95:5 to 50:50, where styrene can be replaced entirely or to some extent by alpha-methylstyrene, and where acrylonitrile can be replaced entirely or to some extent by methyl methacrylate or N-phenylmaleimide; and from 40 to 85% by weight, of the polybutadiene latices.

10. The thermoplastic molding composition F as claimed in claim 1, where the inorganic persalt initiation respectively comprises addition of one or more salts selected from the group consisting of ammonium persulfate, sodium persulfate, potassium persulfate, potassium perphosphate, sodium perborate and mixtures of two or more thereof.

11. A process for the production of a thermoplastic molding composition F as claimed in claim 1 comprising the following steps:
   (i) provision of the at least one polybutadiene latex C with average particle diameter $d_{50}$ from 10 to 220 nm;
   (ii) production of the at least one polybutadiene latex A with average particle diameter $d_{50}$ from 230 to 330 nm and the at least one polybutadiene latex B with average particle diameter $d_{50}$ from 340 to 480 nm by seed polymerization on the polybutadiene latex C from step (i);
   (iii) production of the graft rubber P-I by emulsion polymerization of styrene and acrylonitrile in a ratio by weight of from 95:5 to 50:50, by means of inorganic persalt initiation, where styrene can be replaced entirely or to some extent by alpha-methylstyrene, and where acrylonitrile can be replaced entirely or to some extent by methyl methacrylate or N-phenylmaleimide, in the presence of the polybutadiene latices A and B from step (ii);

(iv) production of the graft rubber P-II by emulsion polymerization of styrene and acrylonitrile in a ratio by weight of from 95:5 to 50:50, by means of inorganic persalt initiation, where styrene can be replaced entirely or to some extent by alpha-methylstyrene, and where acrylonitrile can be replaced entirely or to some extent by methyl methacrylate or N-phenylmaleimide, in the presence of the polybutadiene latex C;

(v) mixing of the emulsions made of the graft rubbers P-I and P-II from steps (iii) and (iv);

(vi) coprecipitation of the graft rubbers P-I and P-II from the emulsion, from step (v), which comprises these graft rubbers P-I and P-II;

(vii) isolation of the coprecipitated graft rubbers P-I and P-II from step (vi) by filtration or centrifugation;

(viii) drying of the isolated coprecipitated graft rubbers P-I and P-II from step (vii); and (ix) at from 200 to 300° C., mixing of the dried coprecipitated graft rubbers P-I and P-II from step (viii) with the at least one rubber-free copolymer matrix P-III made of styrene and acrylonitrile in a ratio by weight of from 95:5 to 50:50, where styrene can be replaced entirely or to some extent by alpha-methylstyrene.

12. The process as claimed in claim 11, where styrene monomers and acrylonitrile monomers are added continuously to the polybutadiene latices A and B and, respectively, polybutadiene latex C in step (iii), in step (iv) or in steps (iii) and (iv) for production of a graft rubber P-I, a graft rubber P-II or a combination of the graft rubbers P-I and P-II.

13. The process as claimed in claim 11, where the coprecipitation in step (vi) comprises at least one of the following:
a) with simultaneous mixing by stirring, the action of aqueous electrolyte solutions;
b) the action of temperatures of from 20 to 150° C.;
c) the action of shear forces;
d) drying
e) or a combination of two or more of a) to d).

14. A molding obtainable from a thermoplastic molding composition F as claimed in claim 1.

15. The thermoplastic molding composition F as claimed in claim 1, where the average particle diameter $d_{50}$ of the polybutadiene latex A is from 250 to 310 nm, and gel content of 45 to 70% by weight.

16. The thermoplastic molding composition as claimed in claim 1, where the average particle diameter $d_{50}$ of the at least one polybutadiene latex C is from 30 to 200 nm, and gel content of from 50 to 92% by weight.

17. The thermoplastic molding composition F as claimed in claim 1, where the ratio A:B by weight of the solids of the polybutadiene latices is from 60:40 to 40:60.

18. The thermoplastic molding composition F as claimed in claim 1, where the P-I:P-II ratio by weight of the graft rubbers is from 70:30 to 35:65.

19. The thermoplastic molding composition F as claimed in claim 1, wherein the mixture of coprecipitated graft rubbers P-I and P-II is dried until moisture content is <1% by weight before it is mixed with the at least one rubber-free copolymer matrix P-III.

* * * * *